United States Patent
Sohmshetty et al.

(10) Patent No.: US 12,157,158 B2
(45) Date of Patent: Dec. 3, 2024

(54) METHOD AND APPARATUS FOR FORMING VARIED STRENGTH ZONES OF A VEHICLE COMPONENT

(71) Applicant: FORD GLOBAL TECHNOLOGIES, LLC, Dearborn, MI (US)

(72) Inventors: Raj Sohmshetty, Canton, MI (US); Torsten Hallfeldt, Eschweiler (DE); S. George Luckey, Jr., Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 530 days.

(21) Appl. No.: 17/469,447

(22) Filed: Sep. 8, 2021

(65) Prior Publication Data

US 2021/0402452 A1 Dec. 30, 2021

Related U.S. Application Data (62) Division of application No. 15/625,150, filed on Jun. 16, 2017, now Pat. No. 11,141,769.

(51) Int. Cl.
*B21D 22/02* (2006.01)
*B21D 37/16* (2006.01)
(Continued)

(52) U.S. Cl.
CPC .......... *B21D 22/022* (2013.01); *B21D 37/16* (2013.01); *B21D 53/88* (2013.01); *B62D 29/007* (2013.01);
(Continued)

(58) Field of Classification Search
CPC ........ B21D 22/022; B21D 37/16; C21D 1/18; C21D 2211/008; C21D 2221/01; C21D 8/0205; C21D 8/0294
See application file for complete search history.

(56) References Cited

U.S. PATENT DOCUMENTS

| 7,678,208 B2 | 3/2010 | Bodin |
| 8,118,954 B2 | 2/2012 | Beenken et al. |

(Continued)

FOREIGN PATENT DOCUMENTS

| CN | 202079178 | 12/2011 |
| CN | 102481613 A | 5/2012 |

(Continued)

OTHER PUBLICATIONS

DePoorter, G. et al. "Structural ceramics." 1990. ASM Handbook vol. 2. p. 1019-1024. (Year: 1990).*

(Continued)

*Primary Examiner* — Nicholas A Wang
(74) *Attorney, Agent, or Firm* — Vincent Mastrogiacomo; Brooks Kushman P.C.

(57) ABSTRACT

A die apparatus including a first die element, a plurality of second die elements, a plurality of actuators, and a controller is provided. Each of the plurality of actuators is mounted to one of the plurality of second die elements. The controller is programmed to activate the actuators to contact and compress portions of a blank disposed between the die elements at separate pressures to influence microstructure forming for one of a geometry transition region, a deformation region, and a joining region. One of the separate pressures applied to one of the portions of the blank may be approximately 5 $N/mm^2$ or less to form a soft strength zone. The pressure of approximately 5 $N/mm^2$ or less may be applied to the one of the portions of the blank for approximately one to two seconds.

18 Claims, 4 Drawing Sheets

(51) Int. Cl.
   *B21D 53/88* (2006.01)
   *B62D 29/00* (2006.01)
   *C21D 1/18* (2006.01)
   *C21D 8/02* (2006.01)
   *B60R 19/03* (2006.01)
   *B62D 21/15* (2006.01)

(52) U.S. Cl.
   CPC .............. *C21D 1/18* (2013.01); *C21D 8/0205* (2013.01); *C21D 8/0294* (2013.01); *B60R 19/03* (2013.01); *B62D 21/152* (2013.01); *C21D 2211/008* (2013.01); *C21D 2221/01* (2013.01)

(56) References Cited

U.S. PATENT DOCUMENTS

| | | | |
|---|---|---|---|
| 2007/0017272 A1 | 1/2007 | Kurisu et al. | |
| 2008/0230590 A1 | 9/2008 | Takahashi et al. | |
| 2009/0211669 A1 | 8/2009 | Vehof | |
| 2010/0095733 A1* | 4/2010 | Salamon | C21D 9/46 72/342.2 |
| 2012/0186705 A1* | 7/2012 | Sikora | B21D 37/16 148/714 |
| 2013/0136945 A1 | 5/2013 | Charest et al. | |
| 2016/0010169 A1 | 1/2016 | Lenze et al. | |
| 2016/0010171 A1 | 1/2016 | Naitou et al. | |

FOREIGN PATENT DOCUMENTS

| | | | |
|---|---|---|---|
| CN | 102554048 | * | 7/2012 |
| CN | 102554048 A | | 7/2012 |
| DE | 102015207928 | | 11/2016 |
| WO | 2016046637 A1 | | 3/2016 |
| WO | 2016097224 A1 | | 6/2016 |

OTHER PUBLICATIONS

Shivpuri, R. et al. "Friction and wear of dies and die materials." 1992. ASM Handbook vol. 18. p. 621-648. (Year: 1992).*

Hasselman, D. et al. "Thermal diffusivity of conductivity of dense polycrystalline ZrO2 ceramics: a survey". 1987. American ceramic society. p. 799-806. (Year: 1987).*

Benedyk, J. "H13 steel". High performance alloys database. 2008. p. 1-23 (Year: 2008).*

Benedyk, J. H13 Steel. High performance alloys database (2008), p. 1-23.

DePoorter, G. et al., "Structurel Ceramics," ASM Handbook, v. 2, Properties and Selection: Nonferrous Alloys and Special-Purpose Materials, ASM Handobok Committee, pp. 1019-1024 (1990).

Kolleck, R. et al., "Tools and Technologies for Hot Forming with Local Adjustment of Part Properties," Materials Science Forum, (2019), vols. 638-642, pp. 3919-3924.

Shivpuri, R. et al., "Friction and Wear of Dies and Die Materials," 1992, ASM Handbook, v. 18, P.J. Biau, editor, pp. 621-648.

Hasselman, D.P.H. et al., "Thermal Diffusivity and Conductivity of Dense Polycrystalline ZrO2 Ceramics: A Survey," Ceramic Bulletin, v. 66, No. 5 (1987), pp. 799-806.

Chinese Office Action for CN Application No. 2018106120927 dated Mar. 30, 2024 and English Translation, 20 pages.

Chinese Office Action for CN App. No. 201810612092.7, issued Aug. 15, 2024, and machine translation, 24 pages.

Junying et al., "Theory of Heat-Assisted Plastic Forming of Metal Sheets", Tongji University Press, machine translation, 16 pages, published Aug. 31, 2014.

Research on Automobile Cash Manufacturing Technology, China Society of Automotive Engineers, Beijing Institute of Technology Press, and machine translation, 12 pages, published Oct. 31, 2016.

* cited by examiner

METHOD AND APPARATUS FOR FORMING VARIED STRENGTH ZONES OF A VEHICLE COMPONENT

CROSS-REFERENCE TO RELATED APPLICATIONS

This application is a divisional of U.S. application Ser. No. 15/625,150, filed Jun. 16, 2017, now U.S. Pat. No. 11,141,769, which issued on Oct. 12, 2021, the disclosure of which is hereby incorporated in its entirety by reference herein.

TECHNICAL FIELD

This disclosure relates to a method and apparatus for forming varied strength zones of a vehicle component.

BACKGROUND

Automotive manufacturers are driven to design light weight vehicles with increased performance and reduced fuel consumption. The manufacturers have transitioned from a usage of mild steels for vehicle components to advanced high strength steels and ultra-high strength steels along with aluminum. Hot stamping processes for vehicle components allow creation of fully martensitic structures. However, the hot stamping process may create vehicle components with undesirable qualities. Further, many process variables exist due to a complexity of the hot stamping process.

This disclosure is directed to solving the above problems and other problems as summarized below.

SUMMARY

A die apparatus includes a first die element, a plurality of second die elements, a plurality of actuators, and a controller. Each of the plurality of actuators is mounted to one of the plurality of second die elements. The controller is programmed to activate the actuators to contact and compress portions of a blank disposed between the die elements at separate pressures to influence microstructure forming for one of a geometry transition region, a deformation region, and a joining region. One of the separate pressures applied to one of the portions of the blank may be approximately 5 N/mm$^2$ or less to form a soft strength zone. The pressure of approximately 5 N/mm$^2$ or less may be applied to the one of the portions of the blank for approximately one to two seconds. One of the separate pressures applied to one of the portions of the blank may be approximately 20 N/mm$^2$ or more to form a hard strength zone. The approximately 20 N/mm$^2$ or more may be applied to the one of the portions of the blank for a time period based on a thickness of the blank to form a fully martensitic microstructure. The first die element may include a coolant channel having a first portion spaced approximately 20 mm or more from one of the portions of the blank and a second portion spaced approximately 8 mm or less from another of the portions of the blank. The first die element and the plurality of second die elements may be of a material having low thermal conductivity at first die element locations adjacent a desired soft strength zone of the blank and of a material having high thermal conductivity at second die element locations adjacent a desired hard strength zone of the blank. The material having a low thermal conductivity may be a ceramic material and the material having high thermal conductivity may be AISI hot work tool steel H13.

A method for forming a targeted soft strength zone for a vehicle component includes activating one or more of a plurality of actuators each mounted to one of a plurality of lower die elements to separately compress a desired soft strength zone of a blank for a predetermined time period against an upper die element at a first pressure sufficient to form the blank into a vehicle component. The method further includes releasing the compression of the one of the plurality of actuators and retaining the vehicle component between the plurality of lower die elements and the upper die element without contacting the die elements to prevent martensitic transformation of the desired soft strength zone of the blank. The method may further include activating another of the one or more of the plurality of actuators to separately compress the blank against the upper die element at a second pressure to influence martensitic transformation of a desired hard strength zone of the blank. The second pressure may be approximately 20 N/mm$^2$ or more. The method may further include aligning the soft strength zone with a first portion of a coolant channel spaced a first distance from the blank; and aligning the hard strength zone with a second portion of the coolant channel spaced a distance less than the first distance from the blank. The first pressure applied may be approximately 5 N/mm$^2$ or less. The predetermined time period may be approximately one to two seconds.

A method for forming a vehicle component having varied strength zones includes positioning a blank between a first die element and a plurality of second die elements each mounted to an actuator so that a desired soft strength zone is spaced from a first portion of a coolant channel of the first die element at a first distance and a desired hard strength zone is spaced from a second portion of the coolant channel at a second distance. The method further includes activating the actuators to compress the blank at a first pressure against the first die element to form the vehicle component. The method further includes activating one or more of the actuators to compress the hard strength zone of the blank at a second pressure against the first die element. The method further includes releasing the compression and retaining the now formed vehicle component between the die elements such that coolant within the coolant channel does not influence a martensitic transformation of the soft strength zone and does influence a martensitic transformation of the hard strength zone. The first pressure may be approximately 5 N/mm$^2$ or less. The second pressure may be approximately 20 N/mm$^2$ or more. The method may further include retaining the formed vehicle component between the die elements so that the soft strength zone of the vehicle component does not contact either of the die elements. The first distance may be between approximately eight millimeters and twenty millimeters. The second distance may be approximately eight millimeters or less.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
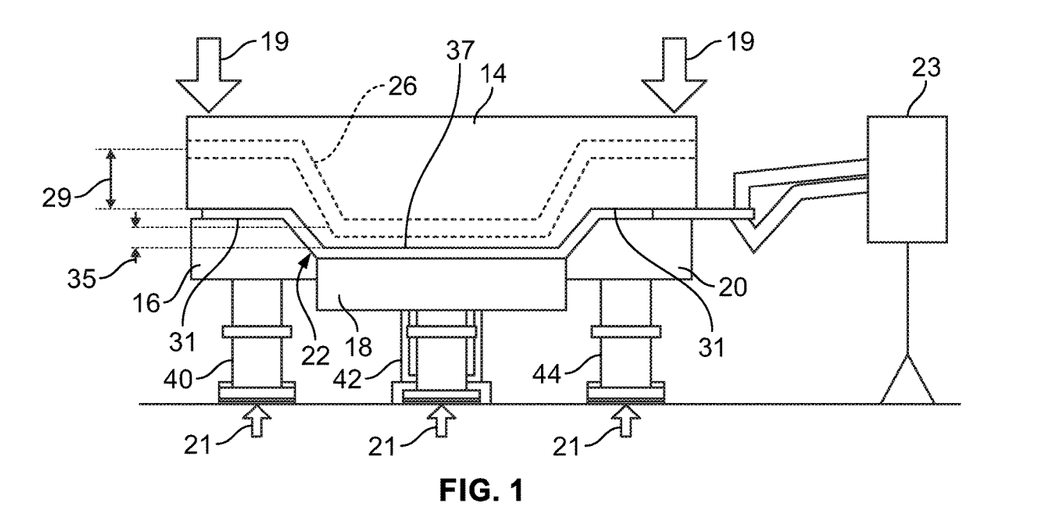
FIG. 1 is a schematic diagram of an example of a die apparatus.

FIG. 1 illustrates a schematic example of a die apparatus, referred to as a die apparatus 10 herein. The die apparatus 10 includes various components including a first die element and a plurality of second die elements. For example, the die apparatus 10 may include an upper die element 14 and a plurality of lower die elements. The plurality of lower die elements may include a first lower die element 16, a second lower die element 18, and a third lower die element 20. The upper die element 14 may vertically translate as represented by arrows 19 or may be stationary. Each of the plurality of lower die elements may vertically translate as represented by arrows 21. In another example, orientations of the upper die element 14 and the plurality of lower die elements may be swapped with one another so that the upper die element 14 is located below the plurality of lower die elements. The upper die element 14 and the plurality of lower die elements may be arranged with one another so that a blank 22 may be positioned therebetween. A fixture 23 may retain the blank 22 in position between the die elements. The upper die element 14 and the plurality of lower die elements may use a differential cooling process and/or pressure applications to form a vehicle component from the blank 22 having desired and varied strength zones along the vehicle component.

The upper die element 14 includes a coolant channel for coolant to flow therethrough. For example, the upper die element 14 may have a coolant channel 26. Other examples of coolant channels are available based on a desired spacing between the blank 22 and the respective coolant channel. Varied spacing between the coolant channel and the blank 22 assists in forming varied strength zones along the blank 22 when coolant flows through the coolant channel 26.

A first length 29 between the blank 22 and the coolant channel 26 of approximately twenty millimeters or more assists in forming a soft strength zone 31 of the blank 22 when coolant flows through the coolant channel 26. The soft strength zone 31 may be located at a joining location for the blank 22 or the vehicle component and may include a microstructure having one or both of pearlite and ferrite and has a tensile strength of 400 to 600 MPa. Generally, the soft strength zone will have low thermal conductivity characteristics (less than 10 W/m-k) and a low surface absorptivity characteristic with a reflective coating. Ceramic is one example of a material having low thermal conductivity. While in this example the soft strength zone 31 is located at a joining location, it is contemplated that the soft strength zone 31 may be located at various types of vehicle component zones in which the associated microstructure of the soft strength zone 31 is desired. Another example of a location for the soft strength zone includes a location on a vehicle component adjacent a harder strength zone in which the soft strength zone is arranged to absorb energy prior to the energy reaching the harder strength zone.

A second length 35 between the blank 22 and the coolant channel 26 of approximately eight millimeters or less assists in forming a hard strength zone 37 of the blank 22 when coolant flows through the coolant channel. The hard strength zone has a fully martensitic microstructure and a tensile strength of 1000 to 1900 MPa. Generally, the hard strength zone will have high thermal conductivity characteristics (greater than 25 W/m-k) and a high surface absorptivity characteristic. AISI hot work tool steel H13 is one example of a material having high thermal conductivity.

The die apparatus 10 may also use pressure applications to form the various strength zones of a vehicle component. As mentioned above, each of the plurality of lower die elements may operate to retain one or more portions of the blank 22 at the desired spacing from the coolant channel 26 of the upper die element 14. Each of the lower die elements may also apply a pressure to the blank 22 at different portions of the blank 22 to form varied microstructures. For example, the first lower die element 16 may be mounted to a first actuator 40, the second lower die element 18 may be mounted to a second actuator 42, and the third lower die element 20 may be mounted to a third actuator 44. In one example, each of the actuators is an air driven cylinder. A controller (shown in FIG. 2) may be in communication with the actuators and a coolant distributor (shown in FIG. 2) to direct operation of the die apparatus 10.

Figure 2:
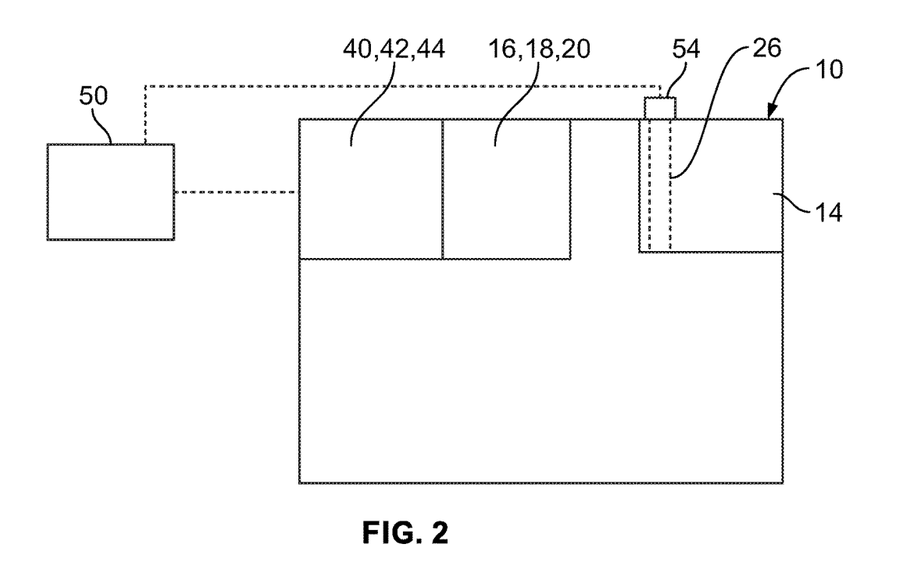
FIG. 2 is a block diagram of an example of a vehicle component forming system.

FIG. 2 is a block diagram illustrating an example of a system for forming varied strength zones of a vehicle component. The system includes a die apparatus, such as the die apparatus 10, and a controller 50. The controller 50 is in communication with the first actuator 40, the second actuator 42, the third actuator 44, and a coolant distributor 54 to direct operation thereof. The controller 50 may direct each of the actuators to operate at a separate pressure and to direct the coolant distributor 54 to deliver coolant to a coolant channel, such as the coolant channel 26. For example, separate pressure commands from the controller 50 direct each of the actuators to contact and apply a pressure to different portions of the blank 22 positioned between the upper die element 14 and the plurality of lower die elements.

To form a hard strength zone, application of a pressure by one of the actuators in an amount of approximately 20 N/mm$^2$ or more is applied to the blank 22. The formed vehicle component may then be held in position until a target temperature of 170 degrees Celsius is reached for the desired hard strength zone. For example, if the formed vehicle component has a thickness of 1.4 millimeters, the formed vehicle component may be held in position for five to six seconds to form the hard strength zone.

To form a soft strength zone, application of a pressure by one of the actuators in an amount of approximately 5 N/mm$^2$ or less is applied to the blank 22. The pressure is held for approximately one to two seconds based on a thickness of the blank 22. After the approximately one to two seconds, the pressure of the actuator is released and the now formed vehicle component is oriented so that minimal or no contact exists between a die surface and the vehicle component. The vehicle component is then held in position until the hard strength zones are formed in desired locations at the approximately 170 degrees Celsius while a temperature of the desired soft strength zones stays above temperatures driving martensitic formation. The vehicle component may then be removed and stored in a holding cell for air cooling.

Figure 3:
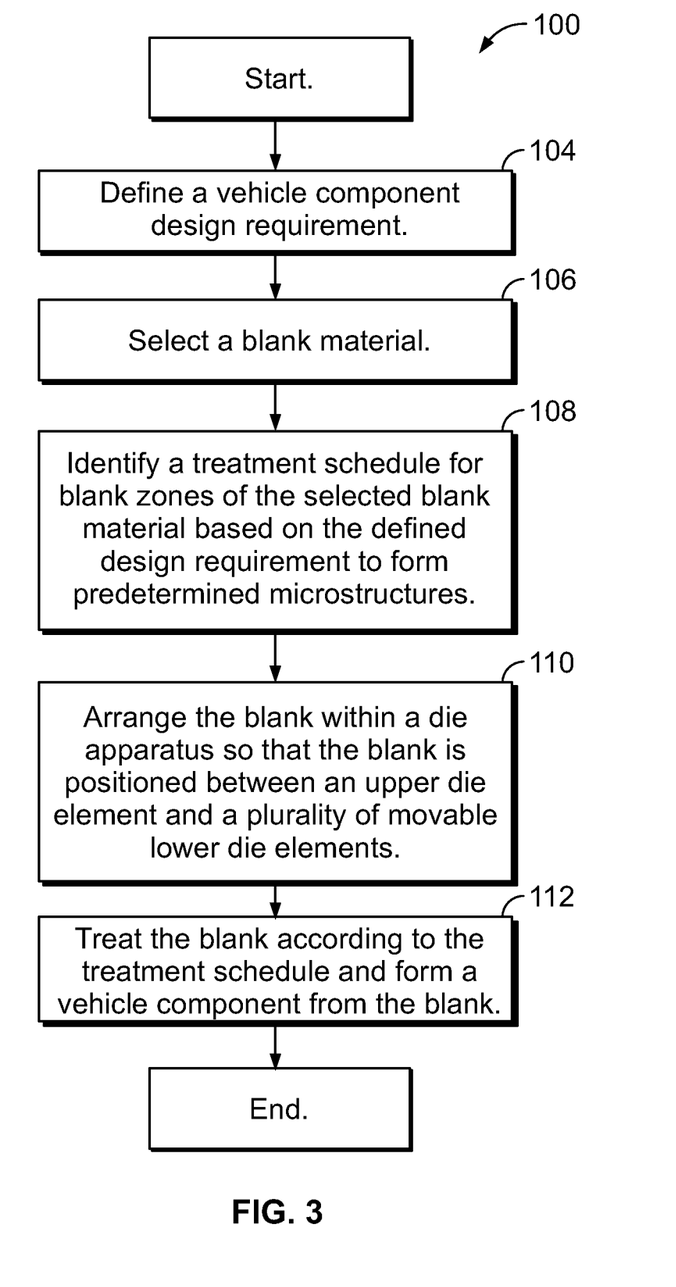
FIG. 3 is a flow chart of an example of a method to form a vehicle component.

FIG. 3 is a flow chart showing an example of a method to form a vehicle component having varied strength zones, referred to as a method 100. The method 100 may use a die, such as the die apparatus 10, and a controller, such as the controller 50, to form a vehicle component having varied strength zones.

In operation 104, a vehicle component design requirement is identified. For example, a portion of a vehicle component may be identified as a joining location comprising an area for securing to another component. A softer strength zone may be preferred for the joining location due to subsequent assembly processes having less difficulty in securing the soft strength zone to another vehicle component in comparison to joining harder strength zones of vehicle components to one another. In another example, deformation characteristics may be identified as a vehicle component design requirement. These deformation characteristics may be based on microstructures of various portions of the vehicle component. The deformation characteristics may include a portion of a vehicle component having a softer strength zone to deform when a load is received to absorb energy from the load prior to reaching adjacent portions of the vehicle component. Non-limiting examples of vehicle components include an underbody assembly rear rail, an underbody assembly front rail, a bumper beam, and cross members of a fuel tank protection assembly.

In operation 106, a type of material for a blank may be selected. Different types of blank materials have different characteristics which may or may not be desirable for particular thermal treatment applications. Examples of materials for blanks include Aperam Hot Forming Grades, Ductibor (HF 340/480), Usibor 1500 (HF1050/1500), Usibor 1900 (HF 1200/1900), US Steel 10B20, Boron, 20MNB5, 22MNB5, 8MNCrB3, 27MnCrB5, and 37MnB4.

The selected blank material may be coated or uncoated. Determination of whether the blank includes a coating and a type of coating may be detected by a sensor. The coating may assist in minimizing or preventing oxidation of a surface of the blank under certain thermal conditions such as a heat treatment of 250 degrees Celsius or higher. The coating may also provide corrosion resistance benefits for vehicle components which may be later subjected to environment conditions. Examples of substances for the coating include zinc, aluminum-silicon, and zinc-nickel. Uncoated blanks may be used for vehicle components that do not need to be designed for surface corrosion prevention.

In operation 108, a treatment schedule is identified to treat targeted zones of the blank based on the previously defined design requirement to form predetermined microstructures or strength zones of the vehicle component. The treatment schedule may include a use of coolant within a coolant channel to influence austenitization and pressure applications to influence desired microstructure formation.

In operation 110, the blank is arranged with the die apparatus between an upper die element and a plurality of lower die elements based on the identified design requirement to form the predetermined microstructures. In operation 112, the treatment schedule may be applied to the blank and the vehicle component may be formed from the blank.

For example, to form a soft strength zone, the upper and lower die elements may be closed and an amount of pressure of approximately 5 N/mm² or less between is applied to the blank by actuators mounted to the lower die elements for one to two seconds to form a desired component geometry and desired microstructure.

To form a hard strength zone, the upper and lower die elements may be closed and an amount of pressure of approximately 20 N/mm² or more is applied to the blank by actuators mounted to the lower die elements for an amount of time based on a thickness of the blank. For example, the pressure of approximately 20 N/mm² or more may be applied for 5 to 6 seconds for a blank having a thickness of 1.4 mm to form the hard strength zone.

Figure 4:
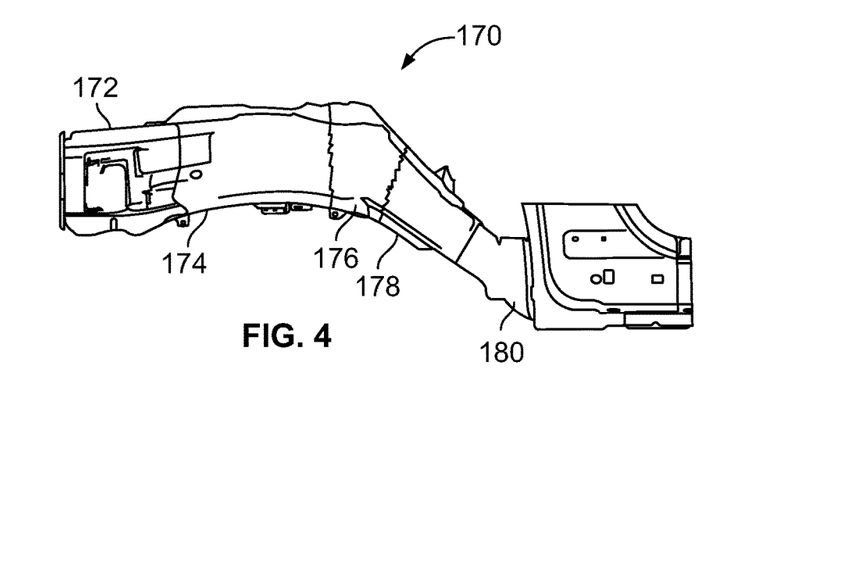
FIG. 4 is a side view of an example of a front rail of an underbody assembly.

FIG. 4 through 7 illustrate examples of vehicle components which may be created with the method 100 described above. FIG. 4 illustrates an example of a front rail 170 for a vehicle underbody assembly which may be treated by the method 100 to accommodate for a design requirement relating to deformation characteristics at a vehicle component geometry transition. The front rail 170 may be created by the method 100 to form various strength zones. For example, the front rail 170 may include a first zone 172, a second zone 174, a third zone 176, and a fourth zone 178. The third zone 176 extends between the second zone 174 and the fourth zone 178. The third zone 176 may be located at a portion of the front rail 170 including a bend at a transition between a front portion of the front rail 170 and an upper end of a backup structure 180. The first zone 172 may be treated to form a soft strength zone. The second zone 174 and the fourth zone 178 may be treated form a hard strength zone. The third zone 176 may be treated to form a strength zone weaker than the hard strength zone.

Treating the second zone 174 to form a hard strength zone allows for the consolidation of separate inner and outer reinforcement parts of engine and transmission attachment brackets into a single inner and outer part.

Treating the third zone 176 to form a softer strength zone relative to the second zone 174 and the fourth zone 178 may create a lower strength material area for creating a "living hinge" or hinge joint to absorb energy and minimize deformation into a rocker, a hinge pillar, and a vehicle cabin when the front rail 170 or a bumper beam is subjected to loading.

Treating the fourth zone 178 to form a hard strength zone may allow reinforcement brackets that are attached to front rail 170 parts to be consolidated in one part. The consolidated reinforcement brackets may be of AHSS material having strength to support a geometry change at a location in which a front portion of the front rail 170 transitions to the backup structure 180 to balance an offset in load direction. The front rail 170 may transition from a substantially straight portion extending rearward and then downward and outboard to meet a vehicle pillar or rocker. A rear portion of the front rail 170 may be subject to a large bending moment due to the geometry change (downward and outboard). In prior art examples, the portion of the rail with a geometry change is typically reinforced with brackets to control deformation. In this example, the backup structure 180 extends longitudinally and outboard relative to a vehicle body. The front rail 170 has a reduced number of components and joints compared to prior art front rails so fewer joining operations are required for assembly.

Figure 5:
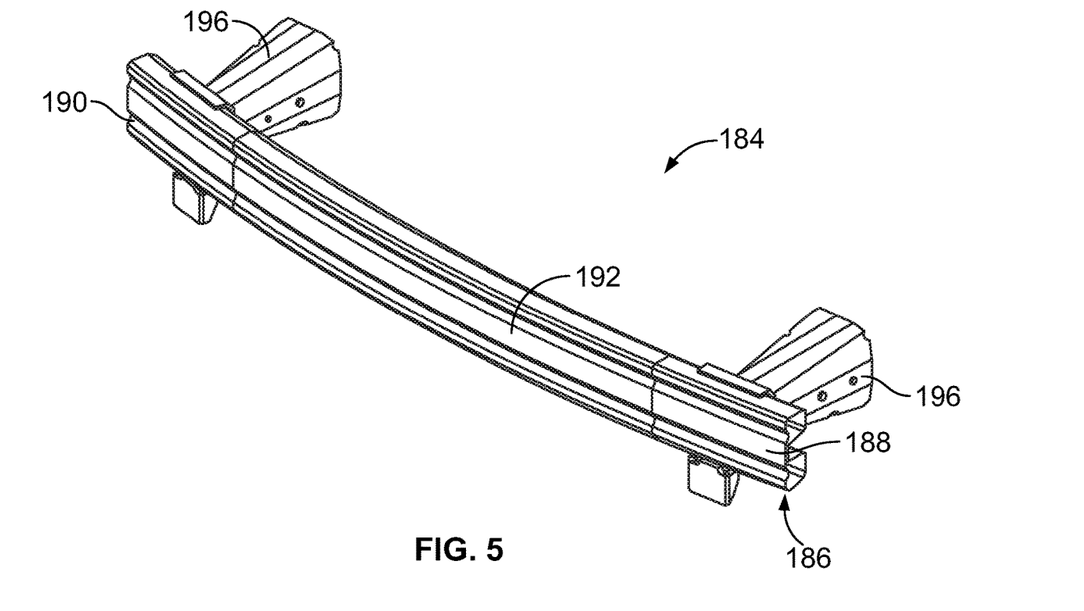
FIG. 5 is a perspective view of an example of a bumper beam assembly.

FIG. 5 illustrates an example of a bumper assembly 184 for a vehicle which may be treated to accommodate various desired strength zones for a design requirement relating to joining characteristics. For example, the bumper assembly 184 includes a bumper beam 186 having a first end 188, a second end 190, and a middle portion 192 extending between the first end 188 and the second end 190. The first end 188 extends inboard and outboard of one of a pair of energy absorbing cans 196. The second end 190 extends inboard and outboard of the other of the energy absorbing cans 196.

The first end 188 and the second end 190 may be treated to define soft strength zones. The middle portion 192 may be treated to form a hard strength zone having a tensile strength between 1000 MPa and 1900 MPa. The zone identifiers may be defined by a microstructure made available on a vehicle component due to the treatment as described in method 100 above. Treating the first end 188 and the second end 190 to form soft strength zones provides for placement of desired microstructures having desired joining characteristics to, for example, join each of the energy absorbing cans 196 to one of the first end 188 and the second end 190.

Figure 6:
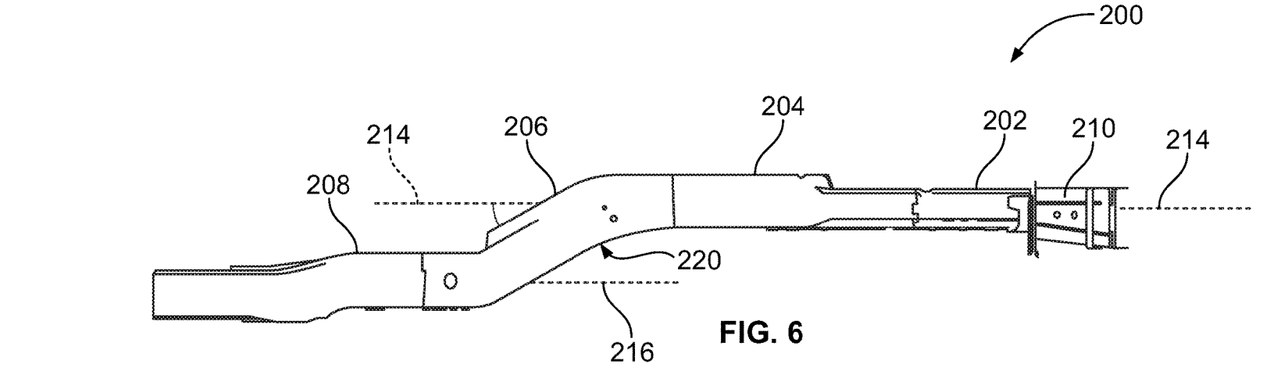
FIG. 6 is a side view of an example of a rear rail of an underbody assembly.

FIG. 6 illustrates an example of a rear rail 200 for a vehicle underbody assembly which may be treated to accommodate a design requirement relating to a geometry transition. The rear rail 200 may be created by the method 100 to form various strength zones. The rear rail 200 includes a rear portion 202, a first mid-portion 204, a second mid-portion 206, and a forward portion 208. An energy absorbing can 210 extends from the rear portion 202. The rear portion 202 defines a first central axis 214. The forward portion 208 and part of the second mid-portion 206 define a second central axis 216. The first central axis 214 may be in a first plane and the second central axis 216 may be in a second plane. The second mid-portion 206 extends from the first central axis 214 to the second central axis 216 at a geometry transition region 220. In one example, the second mid-portion 206 may extend downward and outboard to the forward portion 208.

The first mid-portion 204 may be treated to form a soft strength zone and the second mid-portion 206 may be treated to form a hard strength zone. The rear rail 200 may be treated so that the rear portion 202 and the forward portion 208 do not receive heat or receive minimal heat, or are subjected to appropriate pressure applications, to retain or form soft strength zones.

An arrangement of the different strength zones of the rear rail 200 provides a structure in which deformation occurs nearer a point of loading, e.g. a soft strength zone at the rear portion 202, and the strongest strength zone is located upon the rear rail 200 to structurally reinforce the geometry change at the transition region 220, e.g. a hard strength zone at the second mid-portion 206.

Locating the soft strength zone at the first mid-portion 204 provides a lower strength material area for creating a "living hinge" or hinge joint to absorb energy and minimize deformation into adjacent rockers and a vehicle cabin when the rear rail 200 is subjected to a high load.

Locating the hard strength zone at the second mid-portion 206 minimizes bending which may occur in the rear rail 200 due to the geometry change (downward and outboard) at the transition region 220 without a hard strength zone under an applied axial load.

Figure 7:
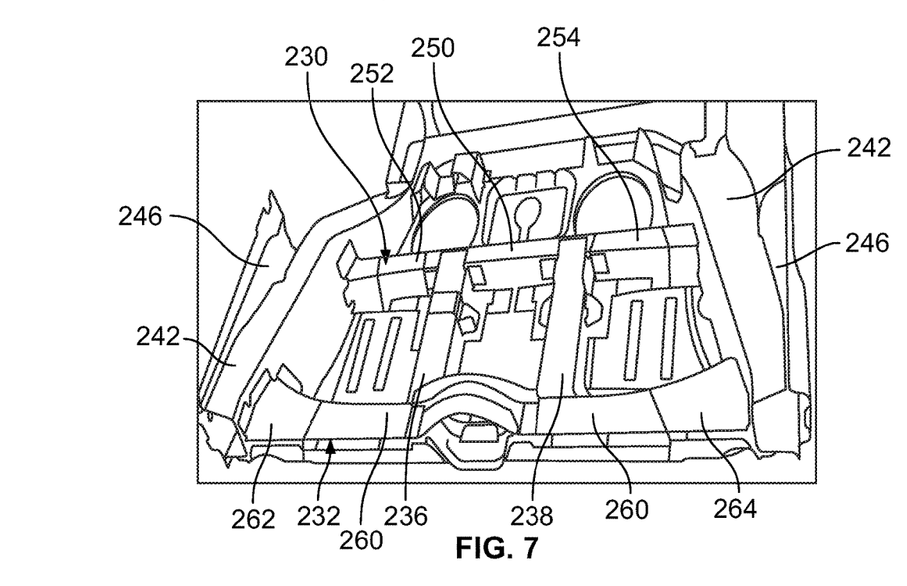
FIG. 7 is a perspective view of a fuel tank protection assembly.

FIG. 7 illustrates an example of a protection assembly for a vehicle underbody in which components may be treated by the method 100 to accommodate for a design requirement relating to targeted deformation characteristics. The protection assembly includes a first cross member 230, a second cross member 232, a first longitudinal member 236, a second longitudinal member 238, and a pair of side rails 242. Each of the first cross member 230 and the second cross member 232 extend between the pair of side rails 242. Each of the pair of side rails 242 is mounted to one of a pair of rockers 246. Each of the first longitudinal member 236 and the second longitudinal member 238 extend between the cross members. The protection assembly provides structural reinforcement and protection for vehicle components subjected to side and rear loading. For example, a vehicle component, such as a fuel tank or seat assembly, may be arranged with the protection assembly to prevent or limit contact to the vehicle component by other vehicle components due to loading. Targeted treatment of the components of the protection assembly assists in preventing or limiting the contact.

For example, the first cross member 230 may be treated by the method 100 to form a hard strength zone at a central region 250 and soft strength zones on either side of the central region 250 at a first end 252 and a second end 254. The second cross member 232 may be treated by the method 100 to form a hard strength zone at a central region 260 and soft strength zones on either side of the central region 260 at a first end 262 and a second end 264.

Treating the ends of the first cross member 230 and the second cross member 232 to form strength zones having a lower tensile strength than the respective central regions may create a lower strength material area for creating a "living hinge" or hinge joint to absorb energy and minimize deformation. The soft strength zones of the ends of the first cross member 230 and the second cross member 232 provide additional deformation distance. A location of soft strength zones assists in facilitating sectional collapse of the first cross member 230 and the second cross member 232 to provide additional energy absorption before the any load reaches the hard strength zone of the respective central region.

While various embodiments are described above, it is not intended that these embodiments describe all possible forms encompassed by the claims. The words used in the specification are words of description rather than limitation, and it is understood that various changes can be made without departing from the spirit and scope of the disclosure. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for forming a targeted soft strength zone for a vehicle component comprising:
   activating one or more of a plurality of actuators each mounted to one of a plurality of lower die elements to separately compress, by first activated actuators, a desired soft strength zone of a blank for a predetermined time period against an upper die element at a first pressure of approximately 5 N/mm² or less to form the blank into a vehicle component, the desired soft strength zone of the vehicle component having soft zone tensile strength of 400 to 600 MPa; and releasing the compression of the activated actuators and retaining the vehicle component between the plurality of lower die elements and the upper die element by a fixture without contacting the lower die elements corresponding to the first activated actuators such that martensitic transformation of the desired soft strength zone of the blank is prevented.

2. The method of claim 1, further comprising:
activating another of the one or more of the plurality of actuators, separate from the first activated actuators, to separately compress the blank against the upper die element, by a second activated actuator, at a second pressure to influence martensitic transformation of a desired hard strength zone of the blank, the desired hard strength zone of the vehicle component having a hard zone tensile strength of 1000 to 1900 MPa.

3. The method of claim 2, wherein the second pressure is approximately 20 N/mm$^2$ or more.

4. The method of claim 2, further comprising:
aligning the soft strength zone with a first portion of a coolant channel spaced a first distance from the blank; and
aligning the hard strength zone with a second portion of the coolant channel spaced a distance less than the first distance from the blank.

5. The method of claim 1, wherein the predetermined time period is approximately one to two seconds.

6. A method for forming a vehicle component having varied strength zones comprising:
positioning a blank between a first die element and a plurality of second die elements each mounted to an actuator so that a desired soft strength zone is spaced from a first portion of a coolant channel of the first die element at a first distance and a desired hard strength zone is spaced from a second portion of the coolant channel at a second distance, the desired soft strength zone of the vehicle component having soft zone tensile strength of 400 to 600 Mpa, and the desired hard strength zone of the vehicle component having a hard zone tensile strength of 1000 to 1900 Mpa;
activating each actuator to compress the blank at a first pressure against the first die element to form the vehicle component with the desired soft strength zone;
further activating a first set of actuators corresponding to the desired hard strength zone to compress the hard strength zone of the blank at a second pressure against the first die element; and
releasing a second set of actuators, different from the first, the second set of actuators corresponding to die elements forming the desired soft strength zone and retaining the now formed vehicle component between die elements corresponding to the first set of actuators such that coolant within the coolant channel does not influence a martensitic transformation of the soft strength zone and does influence a martensitic transformation of the hard strength zone.

7. The method of claim 6, wherein the first pressure is approximately 5 N/mm$^2$ or less.

8. The method of claim 6, wherein the second pressure is approximately 20 N/mm$^2$ or more.

9. The method of claim 6 further comprising retaining the formed vehicle component by a fixture and between die elements corresponding to the first set of actuators so that the desired soft strength zone of the vehicle component does not contact the first die element or the second die elements corresponding to the desired soft strength zone.

10. The method of claim 6, wherein first distance is between approximately eight millimeters and twenty millimeters.

11. The method of claim 6, wherein the second distance is approximately eight millimeters or less.

12. A method comprising:
positioning a blank between a first die element and a plurality of second die elements each mounted to an actuator, with each individual die element having either a low thermal conductivity of less than 10 W/m-k or a high thermal conductivity of greater than 25 W/m-k, and the blank having at least one first a first portion corresponding to a soft strength zone and zone and a second portion corresponding to a hard strength zone, the soft strength zone corresponding to second die elements having the low thermal conductivity and the hard strength zone corresponding to die elements having the high thermal conductivity, the soft strength zone having a desired microstructure of pearlite, ferrite, or both, and having a soft strength zone tensile strength of 400 to 600 Mpa, and the hard strength zone having a desired microstructure of martensite, and having a hard strength zone tensile strength of 1000 to 1900 Mpa;
activating the actuators according to a treatment schedule to individually and independently activate and operate the actuators via separate pressure commands;
directing coolant via a coolant distributor to deliver coolant to a coolant channel in the first die element to influence austenitization and pressure applications for microstructure formation; and
contacting and compressing the blank between the first and second die elements via the actuators based on the at least one first portion and at least one second portion being positioned in a respective pressure zone.

13. The method of claim 12, further comprising releasing the compression and retaining the now formed vehicle component between the first and second die elements such that coolant within the coolant channel does not influence a martensitic transformation of the soft strength zone and does influence a martensitic transformation of the hard strength zone.

14. The method of claim 12, wherein the plurality of second die elements includes a first set defining a first pressure zone of up to 5 N/mm$^2$ with the first die element, and a second set defining a second pressure zone of at least 20 N/mm$^2$ with the first die element.

15. The method of claim 14, wherein the compressing in the first pressure zone is for approximately one to two seconds.

16. The method of claim 14, wherein the compressing in the second pressure zone is applied for a time period based on a thickness of the blank to form a fully martensitic microstructure.

17. The method of claim 12, further comprising:
aligning the soft strength zone with a first portion of a coolant channel in the first die element spaced a first distance from the blank; and
aligning the hard strength zone with a second portion of the coolant channel spaced a distance less than the first distance from the blank.

18. The method of claim 17 further comprising directing coolant via a coolant distributor to deliver coolant to the coolant channel to influence austenitization and pressure applications for microstructure formation.

* * * * *